(12) United States Patent
Bykowski et al.

(10) Patent No.: US 10,634,111 B2
(45) Date of Patent: Apr. 28, 2020

(54) IGNITION MODULE FOR INTERNAL COMBUSTION ENGINE WITH INTEGRATED COMMUNICATION DEVICE

(71) Applicant: Kohler Co., Kohler, WI (US)

(72) Inventors: Jonathan T. Bykowski, Shorewood, WI (US); Michael R. Kleczewski, Cleveland, WI (US); Pezaan S. Patrawala, Sheboygan, WI (US)

(73) Assignee: KOHLER CO., Kohler, WI (US)

( * ) Notice: Subject to any disclaimer, the term of this patent is extended or adjusted under 35 U.S.C. 154(b) by 95 days.

(21) Appl. No.: 15/829,540

(22) Filed: Dec. 1, 2017

(65) Prior Publication Data

US 2018/0163689 A1 Jun. 14, 2018

Related U.S. Application Data

(60) Provisional application No. 62/432,926, filed on Dec. 12, 2016.

(51) Int. Cl.
*F02P 15/00* (2006.01)
*F02M 19/02* (2006.01)
(Continued)

(52) U.S. Cl.
CPC ............ *F02P 15/006* (2013.01); *F02D 41/04* (2013.01); *F02D 41/067* (2013.01); *F02D 41/22* (2013.01); *F02M 19/02* (2013.01); *F02N 11/0807* (2013.01); *F02P 11/04* (2013.01); *F02P 17/00* (2013.01); *F02D 2200/021* (2013.01);
(Continued)

(58) Field of Classification Search
CPC ........ F02P 15/006; F02M 19/02; F02D 41/22; F02D 41/04; F02D 41/067; F02N 11/04; B60R 25/04; B60R 25/045; B60R 2325/105

See application file for complete search history.

(56) References Cited

U.S. PATENT DOCUMENTS

| | | | |
|---|---|---|---|
| 1,812,517 | A | 6/1931 | Dorn |
| 5,568,121 | A | 10/1996 | Lamensdorf |

(Continued)

FOREIGN PATENT DOCUMENTS

| | | |
|---|---|---|
| CN | 2381807 Y | 6/2000 |
| CN | 1667259 | 9/2005 |

(Continued)

OTHER PUBLICATIONS

Hobson, James; "World's First Internet Connected Lawnmower", https://hackaday.com/2015/06/10/worlds-first-internet-connected-lawnmower/ pp. 1-6, Jun. 10, 2015.

(Continued)

*Primary Examiner* — George C Jin
(74) *Attorney, Agent, or Firm* — The Belles Group, P.C.

(57) ABSTRACT

An electronic device for the ignition system of an engine, which may incorporate circuitry for voltage amplification via transformer action, while also containing circuitry for sensing operational parameters, circuitry for calculation of derived values from the sensed data or operational parameters, circuitry for storage of the data and derived values, circuitry for engine system control, and circuitry for the wireless communication of data and derived values.

12 Claims, 6 Drawing Sheets

(51) Int. Cl.

| | | |
|---|---|---|
| *F02D 41/04* | (2006.01) | |
| *F02D 41/22* | (2006.01) | |
| *F02P 17/00* | (2006.01) | |
| *F02D 41/06* | (2006.01) | |
| *F02P 11/04* | (2006.01) | |
| *F02N 11/08* | (2006.01) | |
| *G07C 5/00* | (2006.01) | |
| *G07C 5/08* | (2006.01) | |
| *H04W 4/80* | (2018.01) | |
| *F02P 1/08* | (2006.01) | |
| *F02P 3/00* | (2006.01) | |

(52) U.S. Cl.
CPC .... *F02D 2200/70* (2013.01); *F02N 2300/302* (2013.01); *F02N 2300/304* (2013.01); *F02P 1/086* (2013.01); *F02P 3/00* (2013.01); *G07C 5/006* (2013.01); *G07C 5/008* (2013.01); *G07C 5/0808* (2013.01); *H04W 4/80* (2018.02)

(56) References Cited

U.S. PATENT DOCUMENTS

| | | | |
|---|---|---|---|
| 5,803,043 | A | 9/1998 | Bayron et al. |
| 5,826,205 | A | 10/1998 | Koelle et al. |
| 5,949,247 | A | 9/1999 | Lima et al. |
| 6,115,713 | A | 9/2000 | Pascucci et al. |
| 6,163,088 | A | 12/2000 | Codina et al. |
| 6,338,013 | B1 | 1/2002 | Ruffner |
| 6,392,312 | B1 | 5/2002 | Morris |
| 6,522,955 | B1 | 2/2003 | Colborn |
| 6,560,528 | B1 * | 5/2003 | Gitlin .................. F02D 41/2422 123/406.62 |
| 6,631,310 | B1 | 10/2003 | Leslie |
| 6,653,821 | B2 | 11/2003 | Kern et al. |
| 6,657,416 | B2 | 12/2003 | Kern et al. |
| 6,668,629 | B1 | 12/2003 | Leslie |
| 6,707,169 | B2 | 3/2004 | Shimizu et al. |
| 6,744,352 | B2 | 6/2004 | Lesesky et al. |
| 7,030,514 | B2 | 4/2006 | Wareham et al. |
| 7,076,348 | B2 | 7/2006 | Bucher et al. |
| 7,257,426 | B1 | 8/2007 | Witkowski et al. |
| 7,333,922 | B2 | 2/2008 | Cannon |
| 7,356,305 | B2 | 4/2008 | Peeters |
| 7,544,943 | B2 | 6/2009 | Luk |
| 7,583,401 | B2 | 9/2009 | Lewis |
| 7,587,264 | B2 | 9/2009 | Furuno et al. |
| 7,660,652 | B2 | 2/2010 | Smith et al. |
| 7,734,380 | B2 | 6/2010 | Ransom et al. |
| 7,747,739 | B2 | 6/2010 | Bridges et al. |
| 7,787,997 | B2 | 8/2010 | Richards et al. |
| 7,990,985 | B2 | 8/2011 | Chen |
| 8,027,761 | B1 | 9/2011 | Russell |
| 8,055,403 | B2 | 11/2011 | Lowrey et al. |
| 8,139,820 | B2 | 3/2012 | Plante et al. |
| 8,183,995 | B2 | 5/2012 | Wang et al. |
| 8,213,962 | B2 | 7/2012 | Carr |
| 8,224,499 | B1 | 7/2012 | Jarrett, Jr. |
| 8,288,028 | B2 | 10/2012 | Batra |
| 8,315,718 | B2 | 11/2012 | Caffrey et al. |
| 8,345,047 | B2 | 1/2013 | Sanchez |
| 8,463,953 | B2 | 6/2013 | Davis et al. |
| 8,509,812 | B2 | 8/2013 | Fong et al. |
| 8,560,168 | B2 | 10/2013 | Ruther et al. |
| 8,619,141 | B2 | 12/2013 | Anderson |
| 8,676,390 | B2 | 3/2014 | Berry, Jr. et al. |
| 8,704,678 | B2 | 4/2014 | Wang et al. |
| 8,736,438 | B1 | 5/2014 | Vasquez et al. |
| 8,775,846 | B2 | 7/2014 | Robinson et al. |
| 8,833,861 | B2 | 9/2014 | Donnelli et al. |
| 8,868,288 | B2 | 10/2014 | Plante et al. |
| 8,935,440 | B2 | 1/2015 | Davis et al. |
| 8,947,202 | B2 | 2/2015 | Tucker et al. |
| 8,989,959 | B2 | 3/2015 | Plante et al. |
| 9,041,556 | B2 | 5/2015 | Tucker et al. |
| 9,167,418 | B1 | 10/2015 | Tuluca |
| 9,194,091 | B2 | 11/2015 | Moon, Jr. et al. |
| 9,201,842 | B2 | 12/2015 | Plante |
| 9,246,288 | B2 | 1/2016 | Jones |
| 9,265,196 | B2 | 2/2016 | Albinger et al. |
| 2003/0224833 | A1 | 12/2003 | Egan et al. |
| 2003/0236723 | A1 | 12/2003 | Angott |
| 2004/0002794 | A1 | 1/2004 | Pillar et al. |
| 2004/0174070 | A1 * | 9/2004 | Voda .................. B60R 25/04 307/10.2 |
| 2005/0267713 | A1 | 12/2005 | Horkavi et al. |
| 2006/0101927 | A1 | 5/2006 | Blakeley |
| 2006/0123053 | A1 | 6/2006 | Scannell |
| 2006/0154642 | A1 | 7/2006 | Scannell |
| 2006/0277884 | A1 | 12/2006 | Bucher |
| 2007/0088812 | A1 | 4/2007 | Clark |
| 2007/0143000 | A1 | 6/2007 | Bryant et al. |
| 2007/1981671 | | 8/2007 | Dery |
| 2007/0276572 | A1 | 11/2007 | Siemer et al. |
| 2007/0277403 | A1 | 12/2007 | Summer |
| 2008/0039974 | A1 | 2/2008 | Sandin et al. |
| 2008/0073090 | A1 | 3/2008 | Harris |
| 2008/0086391 | A1 | 4/2008 | Maynard et al. |
| 2008/0147267 | A1 | 6/2008 | Plante et al. |
| 2008/0179139 | A1 | 7/2008 | Montgomery |
| 2008/0234919 | A1 | 9/2008 | Ritter et al. |
| 2008/0265844 | A1 * | 10/2008 | Smith .................. F02B 63/04 322/1 |
| 2009/0112394 | A1 | 4/2009 | Lepejian et al. |
| 2009/0125193 | A1 | 5/2009 | Fernandez |
| 2009/0191034 | A1 | 7/2009 | McGhee et al. |
| 2010/0182157 | A1 | 7/2010 | Shaffer et al. |
| 2011/0251807 | A1 | 10/2011 | Rada et al. |
| 2011/0267080 | A1 | 11/2011 | Hedges |
| 2011/0307141 | A1 | 12/2011 | Westerlage et al. |
| 2012/0041635 | A1 | 2/2012 | Johnson et al. |
| 2012/0042936 | A1 | 2/2012 | Feichtinger et al. |
| 2012/0065787 | A1 | 3/2012 | Broniak et al. |
| 2012/0101679 | A1 | 4/2012 | Anderson et al. |
| 2012/0143642 | A1 | 6/2012 | O'Neil |
| 2012/0328370 | A1 | 12/2012 | Gustafsson et al. |
| 2013/0041526 | A1 | 2/2013 | Ouyang |
| 2013/0111864 | A1 | 5/2013 | Hansen et al. |
| 2013/0112673 | A1 | 5/2013 | Petrilla et al. |
| 2013/0192183 | A1 | 8/2013 | Choi et al. |
| 2013/0201316 | A1 | 8/2013 | Binder et al. |
| 2013/0211605 | A1 | 8/2013 | Mansfield et al. |
| 2013/0214602 | A1 | 8/2013 | Frohman et al. |
| 2013/0298575 | A1 | 11/2013 | Stark et al. |
| 2013/0298863 | A1 | 11/2013 | Nuebel et al. |
| 2013/0333671 | A1 | 12/2013 | Walser et al. |
| 2013/0343906 | A1 | 12/2013 | Funke et al. |
| 2014/0111213 | A1 | 4/2014 | Cunningham et al. |
| 2014/0151079 | A1 | 6/2014 | Furui et al. |
| 2014/0249825 | A1 | 9/2014 | Proud |
| 2014/0262560 | A1 | 9/2014 | Dwyer |
| 2014/0265555 | A1 | 9/2014 | Hall et al. |
| 2014/0266659 | A1 | 9/2014 | Dwyer |
| 2014/0266664 | A1 | 9/2014 | Dwyer |
| 2014/0277967 | A1 | 9/2014 | Sprock et al. |
| 2014/0284022 | A1 | 9/2014 | Maxbauer et al. |
| 2014/0371979 | A1 | 12/2014 | Drew et al. |
| 2015/0006025 | A1 | 1/2015 | Rhoades et al. |
| 2015/0007541 | A1 | 1/2015 | Albinger et al. |
| 2015/0008740 | A1 | 1/2015 | Batzler et al. |
| 2015/0019280 | A1 | 1/2015 | Mejegard et al. |
| 2015/0021113 | A1 | 1/2015 | Lefevbre et al. |
| 2015/0025755 | A1 | 1/2015 | Willgert et al. |
| 2015/0039269 | A1 | 2/2015 | Mejegard et al. |
| 2015/0058062 | A1 | 2/2015 | Mejegard et al. |
| 2015/0081359 | A1 | 3/2015 | Mejegard et al. |
| 2015/0100172 | A1 | 4/2015 | Forbes, Jr. |
| 2015/0102121 | A1 | 4/2015 | Dey et al. |
| 2015/0109142 | A1 | 4/2015 | Mejegard et al. |
| 2015/0116132 | A1 | 4/2015 | Nohra et al. |
| 2015/0123815 | A1 | 5/2015 | Mejegard et al. |
| 2015/0128547 | A1 | 5/2015 | Einecke et al. |
| 2015/0134227 | A1 | 5/2015 | Yu |
| 2015/0174766 | A1 | 6/2015 | Jagenstedt et al. |

(56) References Cited

U.S. PATENT DOCUMENTS

| | | |
|---|---|---|
| 2015/0201555 A1 | 7/2015 | Willgert |
| 2015/0204758 A1 | 7/2015 | Schnell et al. |
| 2015/0220086 A1 | 8/2015 | Willgert |
| 2015/0240773 A1 | 8/2015 | Koenen et al. |
| 2015/0316913 A1 | 11/2015 | Rickey et al. |
| 2015/0323974 A1 | 11/2015 | Shuster et al. |
| 2015/0366124 A1 | 12/2015 | Kremmer et al. |
| 2016/0007525 A1 | 1/2016 | Drew et al. |
| 2016/0014954 A1 | 1/2016 | Dwyer |
| 2016/0143216 A1 | 5/2016 | Albinger et al. |
| 2019/0024612 A1* | 1/2019 | Kong .................. F02M 1/10 |

FOREIGN PATENT DOCUMENTS

| | | |
|---|---|---|
| CN | 203325191 | 12/2013 |
| CN | 203398942 | 1/2014 |
| CN | 104144249 | 11/2014 |
| CN | 104884776 | 9/2015 |
| CN | 204835821 | 12/2015 |
| CN | 105604710 A | 5/2016 |
| DE | 102010043894 | 5/2012 |
| DE | 102013113914 | 6/2014 |
| DE | 102013202075 | 8/2014 |
| EP | 974482 A3 | 1/2000 |
| EP | 1933467 | 6/2008 |
| EP | 2128420 A2 | 12/2009 |
| FR | 2753428 A1 | 3/1998 |
| IN | 02280CH2014 | 1/2015 |
| JP | 2002054494 A | 2/2002 |
| KR | 20120075555 | 7/2012 |
| KR | 101326253 | 11/2013 |
| KR | 101410981 | 6/2014 |
| KR | 101463371 | 11/2014 |
| RO | 126154 | 3/2011 |
| TW | M523760 U | 6/2016 |
| WO | 2004094813 | 11/2004 |
| WO | WO10000262 | 1/2010 |
| WO | WO10077198 | 7/2010 |
| WO | WO13062572 | 5/2013 |

OTHER PUBLICATIONS

"Robotic lawnmower features the same sensors found in active safety systems", http://www.newelectronics.co.uk/electronics-technology/robotic-lawnmower-features-the-same-sensors-as-found-in-active-safety-systems/62454/, Jul. 8, 2014.

"Automatic brings the Internet of Things to your car", https://www.engadget.com/2014/03/17/automatic-brings-the-internet-of-things-to-your-car/, Feb. 7, 2018.

"Robomow", https://www.postscapes.com/smarthphone-enabled-lawn-mower-robomow/.

"A Mobile App that helps keep you tractor finely tuned", http://www.cubcadet.com/equipment/CubCadetFullPageArticleDisplayView?langId=-1&storeId=10051&catalogId=14101&pageView=Cubcadet_General/CubConnect.html.

OnStar RemoteLink, OnStar,LLC, https://itunes.apple.com/app/id393584149.

Delta Systems introduces Delta Blue Technology™; the Bluetooth innovation that's redefining OPE, http://deltasystemsinc.com/news/146-delta-systems-introduces-delta-blue-technology-the-bluetooth-innovation-that-s-redefining-outdoor-power-equipment.

Ecotrons Blue-Tooth Adapter, http://www.ecotrons.com/products/ecotrons_bluetooth_adapter/, Ecetrons LLC, 28287 N. Beck Road, STE D5; Wixom, Michigan 48393, USA.

Hyundai's augmented reality app helps idiot-proof car maintenance', https://www.theverge.com/2016/1/5/10712686/hyundai-augmented-reality-owners-manual-video-ar-ces-2016.

BMW augmented reality', https://www.youtube.com/watch?v=P9KPJIA5yds.

Scotts, 'Lawn Care Delivered Right to your Door', https://www.scotts.com/en-us?pageUrl=MyLawnApp&rhmiss-15188002194340000754.

MobiTURF lawn care app', https://www.youtube.com/watch?v=ZisaT9RUyyE.

Chinese Office Action—CN Application No. 201711320399.1, dated May 13, 2019, pp. 1-10.

Extended EP Search for corresponding EP Application No. 17205680.6, dated Aug. 2, 2018. EP.

Office Action issued in related Chinese Application No. 201711320399.1 dated Jan. 9, 2020, with English summary.

* cited by examiner

IGNITION MODULE FOR INTERNAL COMBUSTION ENGINE WITH INTEGRATED COMMUNICATION DEVICE

CROSS-REFERENCE TO RELATED APPLICATIONS

The present application claims the benefit of U.S. Provisional Application No. 62/432,926 filed Dec. 12, 2016, the entirety of which is incorporated herein by reference.

BACKGROUND OF THE DISCLOSURE

The present disclosure generally relates to ignition systems for internal combustion engines, and more particularly to an ignition module with integrated processor and wireless communication circuitry for data acquisition and transfer to a paired electronic device.

Engine systems may include a multitude of devices, sensors, and circuitry used to control operation of the engine and track performance. It is often difficult to find space for all the desired components which may be distributed over various parts of the engine system in a somewhat random manner wherever available space exists. In addition, such an arbitrary arrangement may unavoidably expose sensitive circuitry or devices to the harsh environmental operating conditions of the engine such as heat and vibration, thereby adversely affecting reliability.

An improved engine system is desired.

SUMMARY OF THE DISCLOSURE

Embodiments of an ignition module for an internal combustion engine according to the present disclosure relieves difficulties that exist in finding packaging space for all of desired sensors and circuitry within an engine or machine (as there is often limited space), as well as reducing cost and installation time to connect the various sensors and circuitry. The module also relieves difficulties arising from the reliability of the conductive pathways and electrical connectors required to link the various sensors and circuits. The ignition module for a spark-ignited internal combustion gasoline engine may include circuitry for electromagnetic inductive voltage amplification along with additional functionality of sensing operational parameters, performing basic calculations on sensed data to form derived values, temporary storage of data and derived values, control of engine systems, and communication of data and derived values via wireless communication protocols to other electronic devices.

According to one aspect, an integrated ignition module for an internal combustion engine comprises: a housing configured for attachment to a chassis; an ignition circuit disposed in the housing; a programmable controller disposed in the housing; and a wireless transceiver disposed in the housing, the transceiver operably and communicably coupled to the controller to wirelessly exchange data between the controller and an external electronic device.

According to another aspect, an engine control system comprises: an internal combustion engine; an ignition module housing attached to an engine block of the engine; a programmable controller disposed in the ignition module housing, the controller configured to receive real-time engine operating data measured during operation of the engine by a plurality of sensors communicably coupled to the controller; and a wireless transceiver disposed in the ignition module housing and operably coupled to the controller, the controller configured to wirelessly transmit the engine operating data to an external electronic device.

According to another aspect, a method for assembling an ignition system with integrated telemetry system for an internal combustion engine comprises: providing an ignition module housing; mounting an ignition circuit to the housing, the ignition circuit comprising an ignition coil, a charging coil, and an energy storage device operable to store an electrical charge; mounting a programmable controller to the housing, the controller configured to receive real-time engine operating data measured during operation of the engine by a plurality of sensors communicably coupled to the controller; mounting a wireless transceiver to the housing and operably coupled to the controller, the controller configured to wirelessly transmit the engine operating data to an external electronic device; and mounting the housing to the engine.

BRIEF DESCRIPTION OF THE DRAWINGS

Some embodiments of the invention are disclosed with reference to the accompanying drawings and are provided for illustrative purposes only. The invention is not limited in its application to the details of construction or the arrangement of the components illustrated in the drawings. Rather, the invention is capable of other embodiments and/or of being practiced or carried out in other various ways. The drawings illustrate a best mode presently contemplated for carrying out the invention. Like reference numerals are used to indicate like components. In the drawings.

All drawings are schematic and not necessarily to scale.

DETAILED DESCRIPTION

The features and benefits of the present disclosure are illustrated and described herein by reference to example ("exemplary") embodiments. This description of exemplary embodiments is intended to be read in connection with the accompanying drawings, which are to be considered part of the entire written description. Accordingly, the present disclosure expressly should not be limited to such embodiments illustrating some possible non-limiting combination of features that may exist alone or in other combinations of features; the scope of the claimed invention being defined by the claims appended hereto.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "coupled," "affixed," "connected," "interconnected," and the like refer to a relationship wherein structures are secured or attached to one another either directly or indirectly through intervening structures, as well as both movable or rigid attachments or relationships, unless expressly described otherwise. The terms "sound" and "noise" may be used interchangeably herein unless specifically noted to the contrary.

Ignition systems may be necessary for operating spark-ignited internal combustion engines (such as spark-ignited gasoline engines). An air and fuel mixture which is inducted into such spark-ignited engines may be compressed and then set into a state of combustion by an ignition source. The ignition source within the engine may, for example, be a spark plug positioned with a tip protruding into the chamber. In these examples, the spark plug may form an arc at the tip that may ignite compressed air and fuel mixtures in the chamber. Spark plugs may need several thousand volts to produce the arc under these conditions.

An ignition timing system, such as an ignition coil, may serve as the source of the voltage for the spark plug to produce the arc. Small industrial or consumer engines may be equipped with fixed ignition timing systems that are magneto powered (i.e. system power provided from an external magnet). With this type of design, a moving magnet passes a ferrous laminated core of the fixed ignition timing system, and magnetic lines of force are cut, producing energy for the ignition system. The produced energy may be captured in at least two different ways: 1) in a charge coil used to charge a high voltage capacitor in a capacitor discharge ignition (CDI) module, or 2) by providing current to a primary coil for an inductive module. Once the energy storage device (capacitor or coil) is fully energized, the system will be triggered to release the energy. In many systems, the energy may be transformed from a low voltage (hundreds of volts) to a high voltage (thousands of volts) per Faraday's law by transformer action, which provides sufficiently high voltage to fire the spark plug.

The primary and secondary windings of an ignition coil may be inserted into a container, such as a metal can or plastic housing, where they may be protected from the environment. The fine primary and secondary windings and conductive paths may thus be protected from corrosion which may break a conductive path, or contamination which may bridge a conductive path. The container (metal can or plastic housing, for example) containing the coil assembly may be sealed by the use of resins or epoxies in a vacuum potting operation to completely encapsulate the wires. This process may offer electrical insulation of the high voltages within the conductive paths, mechanical support for protection from vibration which can fatigue and break the conductive paths, and barrier protection from chemical corrosion or contamination which may either break the conductive paths, or short across them.

Ignition modules (such as ignition module 3000) may serve as a replacement to ignition coil systems. Ignition modules may include devices with additional circuits included within the container, which may interface with the coil to control the functions of charging and discharging, thereby controlling combustion ignition.

The incorporated circuits may be able to obtain additional functions, such as measurements of engine operational parameters, control of the ignition system, and also control of air and fuel delivery systems of the engine, all based upon the values that are observed, to achieve optimal engine performance.

Ignition modules may also include and enable circuits designed as telemetry systems for engines. Telemetry systems may broadcast a signal, or multiple signals, containing the data of parameters which fluctuate during operation of the engine or machine. The broadcast signals containing this data may be sent via a variety of wireless communication protocols (such as, but not limited to: LTE, Wi-Fi, Bluetooth, 60-GHz, Z-wave, and Zigbee) and may be received on devices such as computers or cellular phones which are prepared to receive them. The device receiving the signals may include a program or application to display the data or signals to the user of the receiving device.

These types of telemetry systems may allow a user to record, display, and track the operational parameters of the engine. Telemetry may also be used for security ignition lock, ability to view engine and application I.D, remote start capability, ability to change ignition curve (performance) based on changes in temperature or engine speed, and send/download calibration upgrades from manufacturer. The security ignition lock in one implementation may provide the ability to disable ignition when the proximity to phone (via Bluetooth) or keychain tag (via Bluetooth or NFC) is beyond a certain range. This feature can be used by fleet managers to restrict unauthorized equipment use or by consumer market as child lock. This feature can also be tied to proximity sensors inside storage to turn engine off if the unit gets too close to a wall or other equipment. As an example, security lock could be implemented by setting a flag to create a routine that prevents normal module operation. Engine ID could be flashed at production. Application ID would require the customer to access memory to place an identifier specific to their model.

The engine/application ID in one implementation may provide the ability to program in Engine ID and Application ID at the end of the assembly line as a way to keep track of service records. So, when a customer fault code or diagnostics report comes to the user or manufacturer, it is known exactly what engine and application it came from. It can also help customers purchase the right service and repair kits.

The ignition curve control in one implementation may provide that the engine performance can be changed by changing ignition timing. The engine manufacturer can provide the ability to choose between a few modes using the mobile app (e.g. software application) like for example without limitation: Performance mode: Optimize timing for peak performance; Economy mode: Optimize timing for peak combustion and fuel saving but reduced power; or Silent mode: Lock unit at a lower speed close to peak torque for lower noise, which can be used by commercial market for mowing during "quiet hours"; Warm-up mode: Optimize timing to assist with engine warm-up during cold temperature starting, which reduces emissions and unwanted rpm fluctuations; or Limp home mode: Can be used to cut down ignition in case of a critical system/sensor failure, which allows the user to operate equipment in the lowest power mode without overloading the engine.

By understanding the data as it is being produced, as well as understanding the trends in data over time, the user may take actions to help prolong the usable life of the engine, machine, or vehicle. These actions may include making adjustments to engine controls to compensate for the running conditions, altering the use of the engine to compensate for the running conditions, or performing service of the various engine systems when they are anticipated or needed. Other actions may include increasing engine speed, decreasing engine speed, stop operation, delay operation, change the oil, change the oil filter, change the air filter, change spark plugs, change the fuel, and many more.

By transmitting the data and derived values, the user may employ a computer program residing on the paired receiving electronic device to help identify when to make decisions or take action, and help identify which direction to make corrections, and priority of systems under control. Such computer programs may also make decisions and corrections automatically on behalf of the user of the engine or machine via two-way communications between the wireless transceiver 600 and electronic device 610 in which the data for actions is pushed (downloaded) to the ignition module processor 11 from the electronic device.

Some non-limiting embodiments of an ignition device and related system according to the present disclosure include a packaged ignition module 3000 which is designed to house, encapsulate, connect and incorporate the circuits for electromagnetic inductive voltage amplification, multiple sensors of engine operational parameters, circuitry for the manipulation of the data in basic calculations to obtain derived values, circuitry for the temporary storage of the data and derived values, circuitry for the control of operational parameters of the engine, and telemetry or communication circuitry for the wireless broadcast of the data and derived values.

With all of the groupings of electronic circuits within one device (rather than, for example, distributed over several locations), the cost of metal or plastic canisters to house those circuits may be reduced by consolidation. The cost of conductive pathways, and electrical connectors may also be reduced by consolidation and elimination. The cost of encapsulating resins and epoxies is reduced through the use of less resin through consolidation, and reduced time and labor that would be required to fill multiple cavities. Further, the risk of environmental contamination is reduced by consolidation of the circuits within one housing, thereby reducing the carbon footprint by using fewer components and less materials. In some embodiments, the risk of mechanical failure of the conductive pathways and/or electrical connectors is reduced by elimination.

An ignition module that contains many or all of the foregoing and other engine circuits in some embodiments may be more compact, allowing for easier packaging of the sensing, computing, and transmitting components within the space available in a machine or vehicle. Such ignition modules may give the user of the engine or machine opportunities to record, display, and track, the data of operational parameters in real time, as well as the ability to observe trends in the data over time. The ignition module designed to contain some or all of these circuits further allow avenues for computer programs or hard-coded circuitry to notify the user of required actions or service, thereby prolonging the usable life of the engine, machine, or vehicle.

The notification from the circuitry to the user may be in the form of illuminated, audible, or vibratory signals, placards, messages, or dialog fields.

The ignition module further may reduce consumption of oil and gasoline within the engine by providing operational parameters and derived values, and notifying the user to take action or alter use. The ignition module allows avenues for computer programs or hard-coded circuitry to take predetermined autonomous actions to adjust parameters of the running condition, or alter the use of the engine to help prolong the usable life of the engine, machine, or vehicle.

Engine data that has been transferred to the remote electronic device of the operator can help the operator make decisions on the timing and quantity of service part purchases. This engine data can in turn be further transferred to a remote distal device of the engine manufacturer located off site via various internet protocols. Engine data and operator information that has been transferred to the manufacturer can help the manufacturer to predict service part volumes, thereby reducing the purchase of unnecessary parts, and/or warehouse space to store them. The engine data, in combination with the location of the operator, and/or the service use history of the engine, can help the manufacturer of the engine observe trends in actual product use, and make decisions about engine configurations, engine parameters, and future product offerings.

Figure 1:
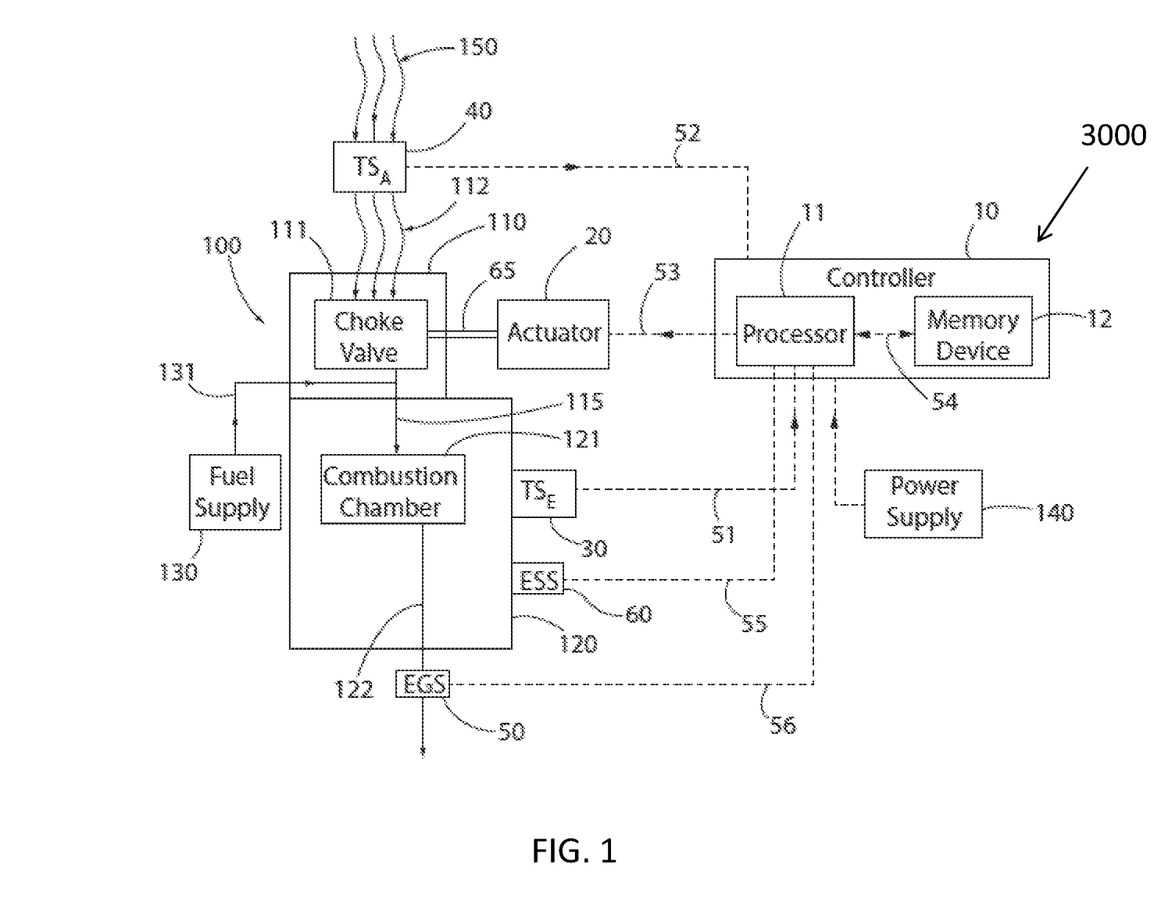
FIG. 1 is a schematic diagram of an engine with an example controller, in accordance with at least some embodiments of the present invention.
Figure 2:
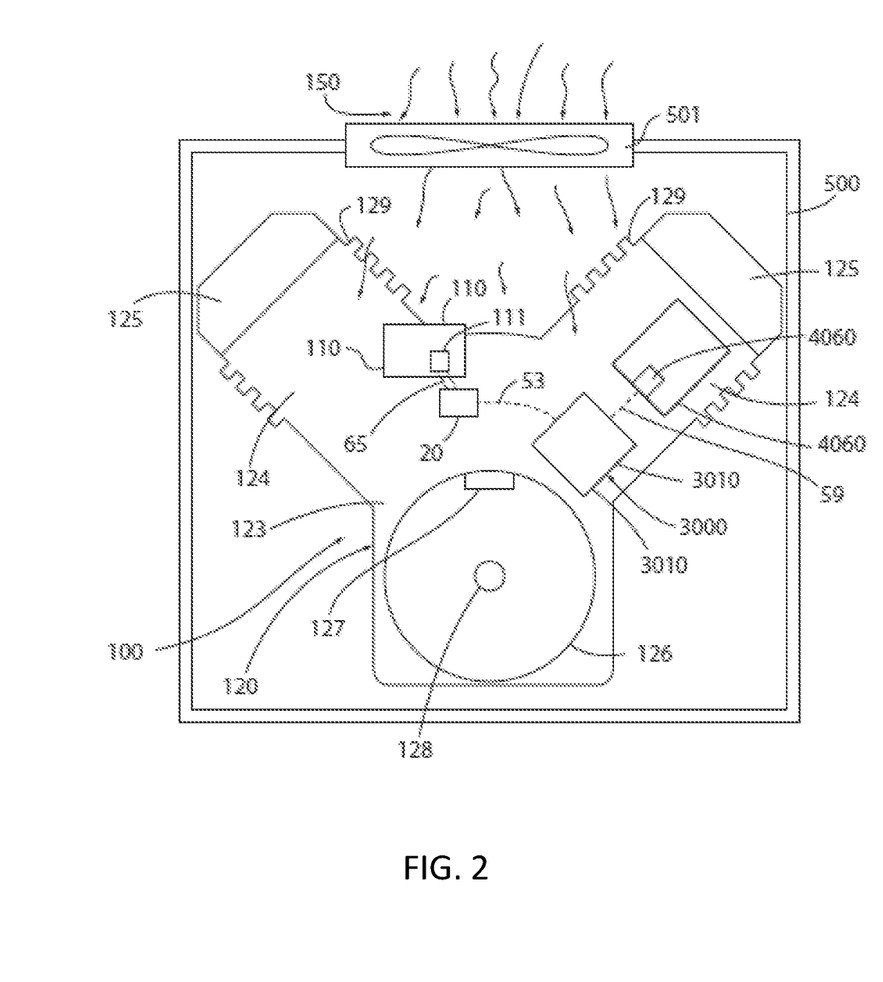
FIG. 2 is a schematic view of an air-cooled internal combustion engine including an example ignition module, in accordance with at least some embodiments of the present invention.
Figure 3:
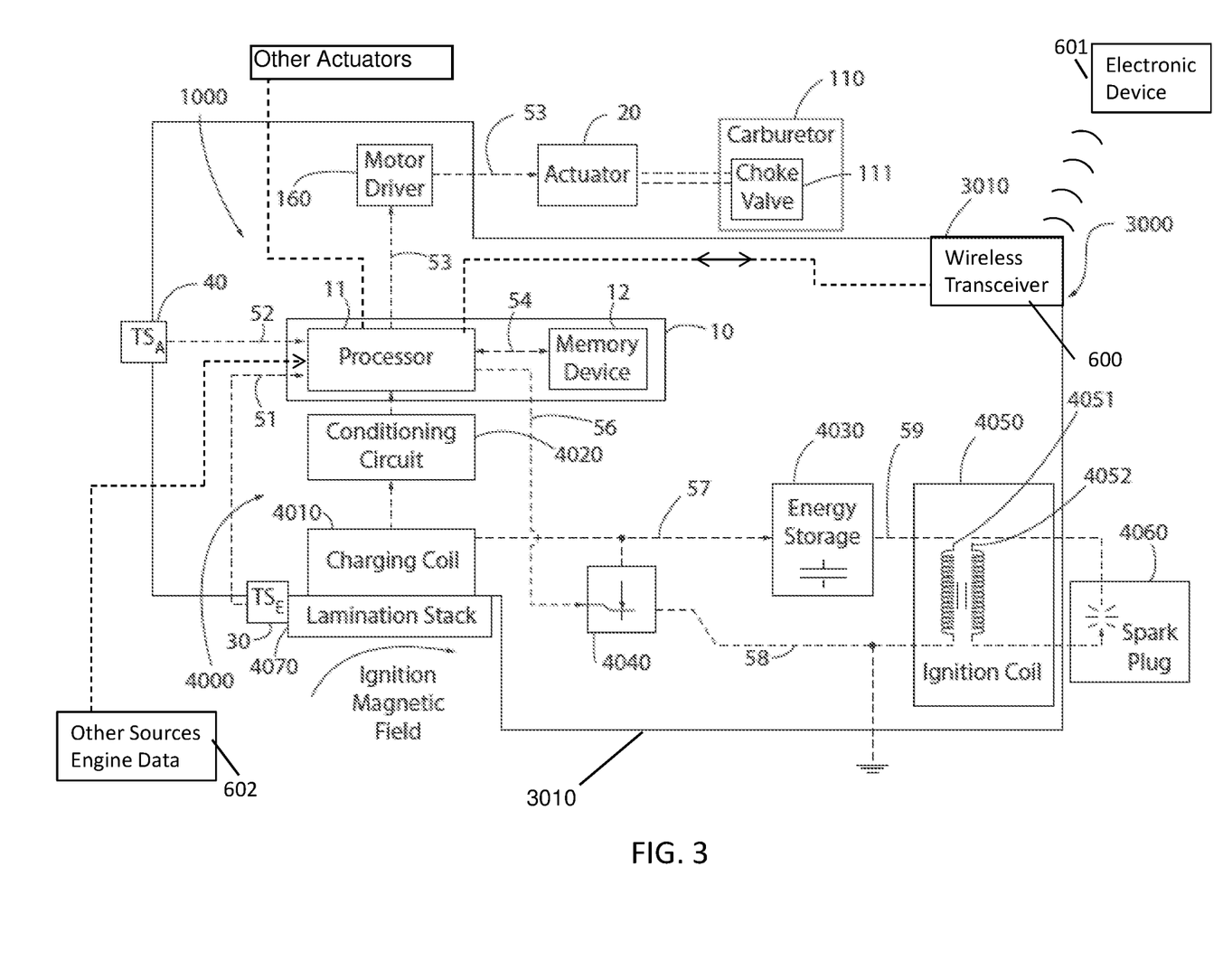
FIG. 3 is a schematic diagram of the ignition module of FIG. 1 which includes an integrated wireless transceiver, in accordance with at least some embodiments of the present invention.
Figure 4:
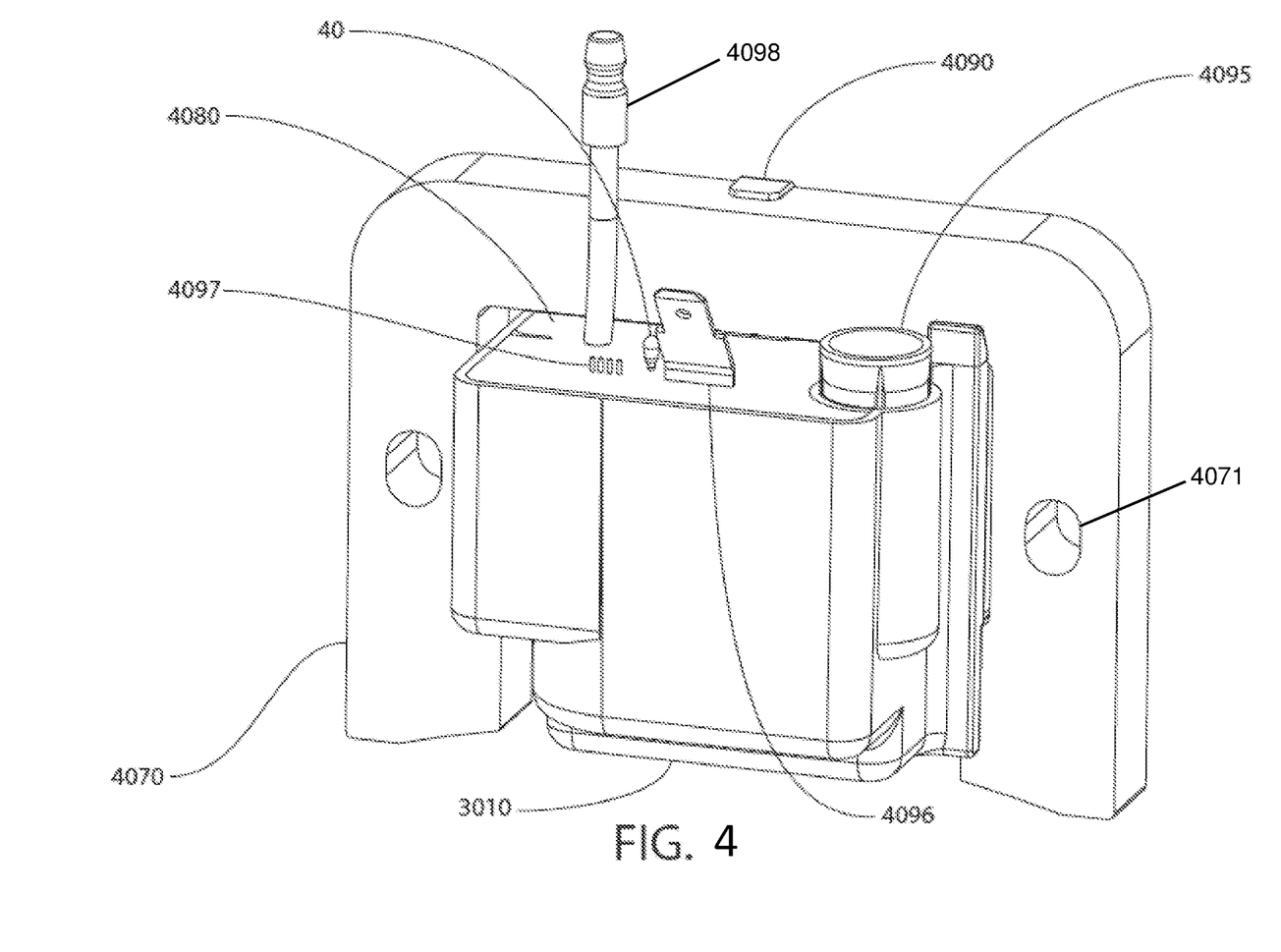
FIG. 4 is a perspective view of a non-limiting structural arrangement of an integrated ignition and wireless transceiver, in accordance with at least some embodiments of an example ignition module housing of the present invention.
Figure 5:
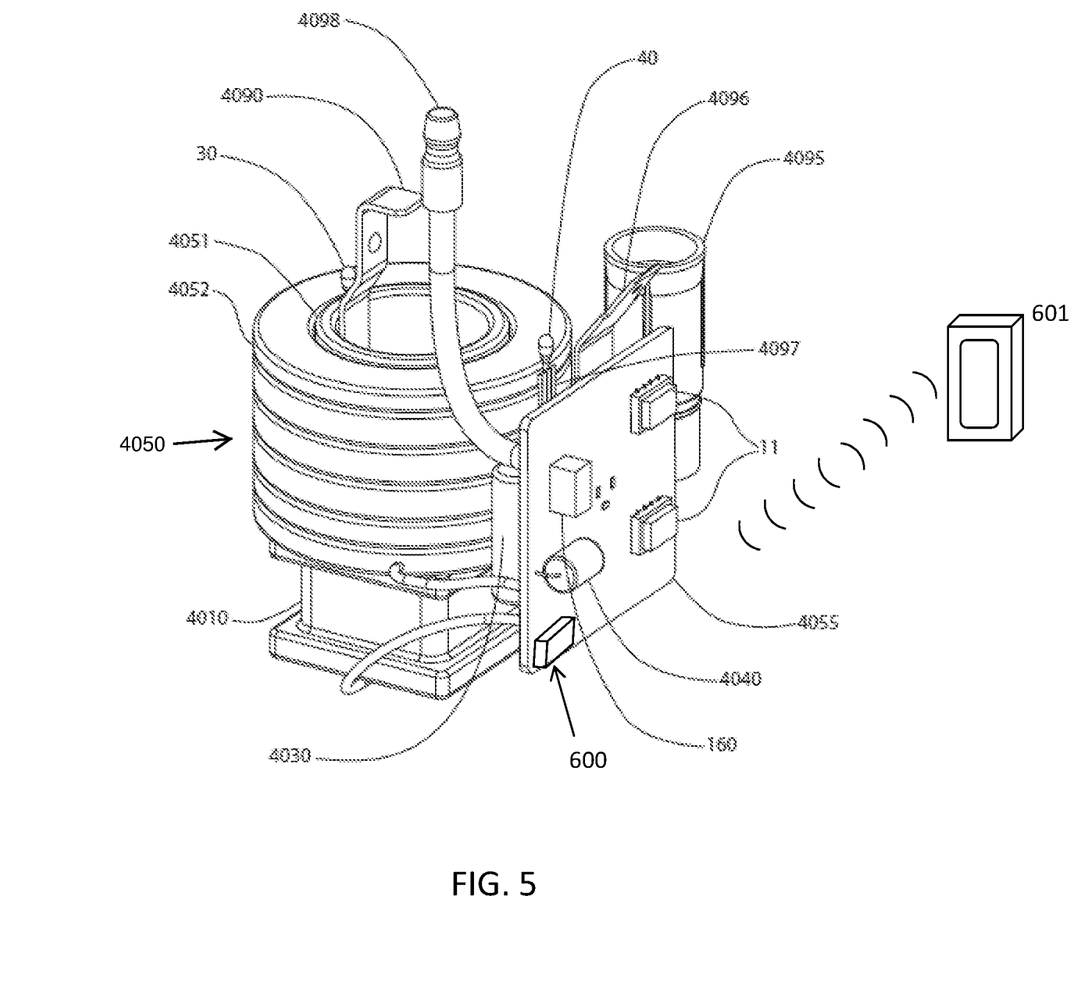
FIG. 5 is a perspective view of internal components of an example integrated ignition and wireless transceiver removed from the housing, in accordance with at least some embodiments of the present invention.
Figure 6:
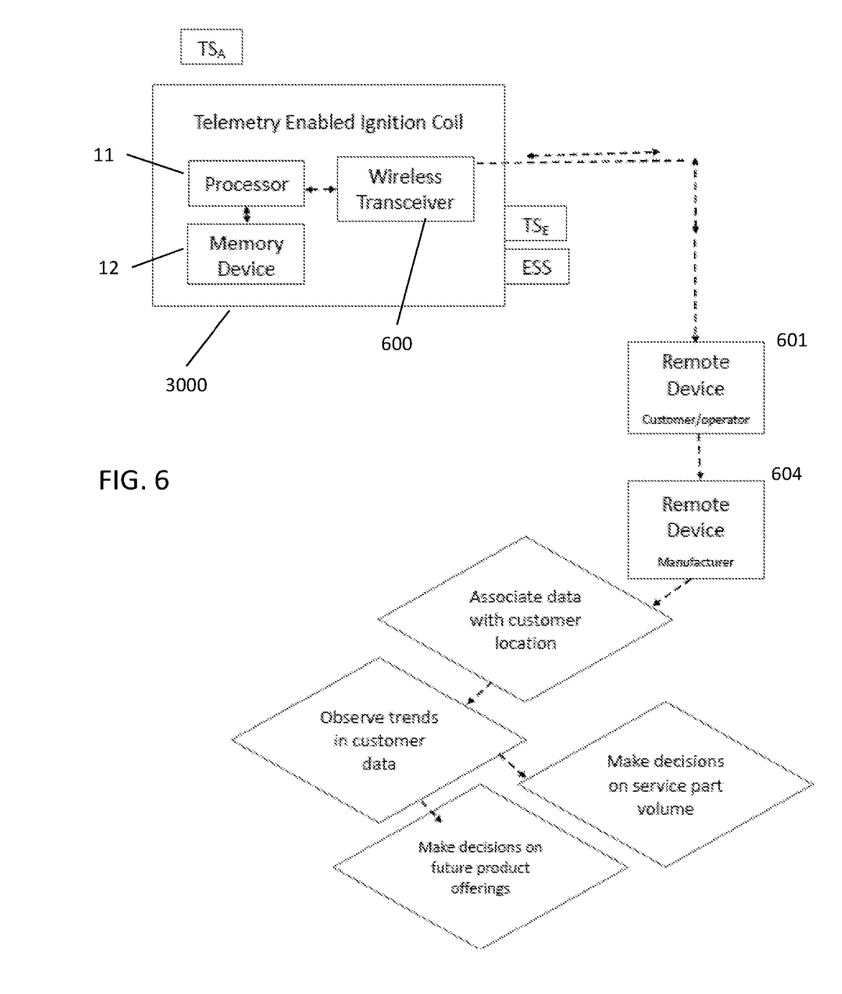
FIG. 6 is a schematic diagram showing data communication and process flow paths between the ignition module and remote electronic devices in operable communication with each other.

FIG. 1 is a schematic diagram of components of an engine with an example programmable controller 10, which may include a processor 11 and a memory device 12. FIG. 2 is a schematic view of an air-cooled internal combustion engine 100 including an example ignition module 3000. FIG. 3 is a schematic diagram of the ignition module 3000 of FIG. 1 which includes an integrated wireless transceiver 600. FIG. 4 is a perspective view of a non-limiting structural arrangement of an ignition module housing 3010 integrating the ignition circuitry and wireless transceiver 600. FIG. 5 is a perspective view of internal components of an example ignition module 3000 integrating the ignition circuitry and wireless transceiver 600, removed from the housing 3010. FIG. 6 is a schematic diagram showing data communication and process flow paths between the ignition module and remote electronic devices in operable communication with each other.

Referring to FIGS. 1-5, the engine 100 may include, or may be connected with, an ignition module 3000. For example, the controller 10 of the engine 100 may be included in, or be connected with, an ignition module 3000.

The ignition module 3000 may include an integrated wireless communication device such as wireless transceiver 600 mounted thereto. The ignition module 3000 may be partially or entirely encapsulated within a container or housing 3010, such as a metal can or a plastic housing, where the ignition module 3000 may be protected from the environment. The housing 3010 (metal can or plastic housing, for example) containing the ignition module 3000 may be sealed by the use of resins or epoxies in a vacuum potting operation to completely encapsulate the wires. Housing 3010 may be configured to attachment to chassis associated with engine or equipment to which the engine is mounted. In one implementation, the housing 3010 may be configured to for attachment to the engine crankcase 123 (see, e.g. FIG. 2), or other portion of the engine.

The transceiver 600 may include circuitry configured to operate the transceiver 600 as a transmitter, a receiver, or both, for exchanging information or data. Transceiver 600 may be operably and communicably linked to processor 11 via a two-way data transfer link and may operate to exchange information, data, and/or control signals with the processor 11. While the transceiver 600 is described herein as being capable of both receipt and transmission of data, in some embodiments, the transceiver 600 may only be a transmitting device, or a receiving device.

Ignition module 3000 and/or processor 11 of controller 10 may be configured to include circuitry, such as ignition circuitry 4000, temperature sensors TSE (engine temperature) and TSA (air temperature), etc. and/or devices (including non-transient computer readable storage medium such as volatile memory, non-volatile memory, etc.) for sensing, collecting, and/or storage of operational parameters, and/or data representing values of or associated with operational parameters, associated with the engine 100. The circuitry and/or devices may also or alternatively sense and/or collect operational parameters and/or data representing values of or associated with said operational parameters of engine 100's auxiliary equipment/systems described herein forming part of the engine operating system. The circuitry and/or devices may gather such operational parameters and/or data for calculation of derived values from the sensed data, for storage of the data and derived values, for engine system control, and/or for the wireless communication of data and derived values to a user's/operator's external electronic device 601 within transmission range. The circuitry and/or devices may include the sensors operable to detect and transmit measured values associated with temperature (e.g. TSE and TSA), pressure, electrical measurement parameters, exhaust gas characteristics, or others of interest.

Electronic device 601 may be or include any electronic device external to the ignition module 3000 and ignition housing 3010 which is equipped to receive wireless signals from and/or transmit wireless signals to the wireless transceiver 600 using a wireless communication protocol (e.g. a "paired" device). Electronic device 601 may be remote, and/or portable. The term "remote" used herein with respect to "remote device" means a device which is not physically incorporated into the ignition module 3000 or located within the housing 3010 the ignition module 3000, and does not necessarily imply and include devices in proximity to the ignition module 3000 or those in a distal location. In some embodiments, the electronic device 601 is not physically connected with the engine 100 or equipment which the engine 100 powers or is incorporated with. In other embodiments, the electronic device may be connected with the engine 100 or equipment the engine 100 is incorporated into, such as a display on a riding lawn mower.

Wireless transceiver 600 may form a wireless telemetry system which may exchange data/signals between the ignition module processor 11 and electronic device 601. The broadcast signals used to wirelessly transfer this data may utilize a variety of wireless communication protocols such as, but not limited to: LTE, Wi-Fi, Bluetooth, 60-GHz, Z-wave, Zigbee, radio, infrared, ultrasonic, GPS, and NFC (near-field communication) as some examples. GPS (global positioning system) may be used to track the engine 100 (or equipment which the engine 100 is incorporated into, such as a lawnmower or snowthrower), and GPS data may be used to identify weather conditions, which the system may respond to for adjusting an engine starting routine.

NFC may be used for tagging, auto start/stop on proximity, and security lock). Infrared may be used for remote start features. In one non-limiting implementation, the wireless transceiver 600 may communicate with a remote electronic device 601 via Bluetooth communication. Other variations are possible.

The electronic device 601 may be configured via software or computer program instructions residing on the device 601 to identify when to make decisions or take action, identify which direction to make corrections, and identify or control priority of systems that may be controlled by the device 601. The computer program or software running on the portable electronic device 601 may also make control decisions and corrections in engine operation autonomously, and transmit control signals to the ignition module processor 11 via the wireless transceiver 600 to alter the engine's operation. Such control signals may be used for example to optimize engine performance, efficiency, and/or correct operating problems. The electronic device 601 may further be programmed to analyze the operating characteristics and parameters of the engine 100 received from the wireless communication device 600 for diagnostic purposes. This could be achieved by setting state flags in memory that when changed would implement special software routines or allow for a different timing curve to be implemented. Additionally, key parameters could be identified that when the number is outside of a given range it activates a different subroutine that modifies engine timing directionally to bring the parameter back into an acceptable range.

In some embodiments, hardwire data link connections like AUX, USB, CAN (or any serial communication), and/or LAN may be used for communicably linking the user's electronic device 601 to the processor 11 of the ignition module 3000.

In some embodiments, the ignition module processor 11 may be communicably linked to other external sensors or sources 602 of engine-related performance and operational data from devices not directly integrated physically with the ignition module 3000 (see, e.g. FIG. 3). This allows processor 11 to act as a central processing hub for collecting and processing all data derived from the engine 100, components of the engine 100, and/or the engine's auxiliary systems including those outside of the ignition module, and then wirelessly communicating that data to the external device 601 via transceiver 600. Examples of engine related performance data that may be monitored and collected include without limitation temperatures, pressures, fuel consumption, valve timing, voltages, amperages, air/fuel ratio, etc. associated with the air, fuel, or combustion systems. For example, there may further be many aspects of oil which can be measured, such as pressure, temperature, viscosity, quality, contamination level, etc. Similar aspects may be measured for air and fuel. Other examples include engine speed in rpm, engine life in hours and choke position, engine load, power and torque to the list. Appropriate sensors or devices may thus be included to measure the foregoing or other engine operating parameters of interest. Other important parameters such as number of unsuccessful start attempts or engine misfires could be used as an indicator that a secondary problem (bad spark plug) might be occurring.

Any suitable processor-based electronic device 601 may be used for communicating with the ignition module processor 11 via wireless transceiver 600, including for example without limitation a portable computer (e.g. laptop), tablet, cell phone, smart phone or watch, PDA, or other device. Alternatively in some embodiments, a desktop type computer may be the electronic device 601.

The wireless transceiver 600 may include appropriate RFI shielding to prevent or minimize interference emanating from electromagnetic sources within the ignition module 3000 or engine 100. In some embodiments, the transceiver 600 may be oriented out of phase with the source of electromagnetic radiation. Integration of the wireless transceiver 600 directly with the ignition module 3000 in lieu of other remote mounting options may protect the integrity and quality of engine data secured, thereby benefitting the user by providing more reliable data which can be acted upon to extend the life of the engine and optimize its performance.

In some implementations, the ignition module processor 11 may be configured via program instructions to collect and analyze engine operating/performance related data and perform basic analytics to generate derived engine data. The external electronic device 601 may configured via program instructions to perform more in-depth analytics on the data received from the processor 11 via wireless transceiver 600 necessary to make engine operational/performance decisions for altering the operation of the engine 100 or initiating maintenance/service procedures.

Engine data collected by the ignition module processor 11 that has been transferred to the remote electronic device 601 or a local on-site operator or user can in turn be further transferred to a second remote distal electronic device 604 of the engine manufacturer located off site via various internet protocols. FIG. 6 is a schematic diagram showing the communication and data processing flow paths. The processor of the manufacturer's device can perform additional analytical steps on the data received as shown in FIG. 6. Additional process steps may be performed. As noted above, engine data and operator information that has been transferred to the manufacturer can help the manufacturer to predict service part volumes, thereby reducing the purchase of unnecessary parts, and/or warehouse space to store them. The engine data, in combination with the location of the operator, and/or the service use history of the engine, can help the manufacturer of the engine observe trends in actual product use, and make decisions about engine configurations, engine parameters, and future product offerings.

The engine 100 may comprise a carburetor 110 and an engine block 120. A fuel supply 130 may be operably coupled to the internal combustion engine 100 (such as to the carburetor 110).

Referring to FIGS. 1-5, the ignition module 3000 may incorporate and include at least portions of an engine control mechanism such as without limitation an electronic auto-choke system 1000, which may be operably coupled to an internal combustion engine 100 (such as a spark-ignited gasoline engine) in accordance with a non-limiting embodiment of the present invention. In some embodiments which include an electronic auto-choke system 1000, this system 1000 may include various components, such as an adjustable choke valve 111 associated with carburetor 110, and various components which may control an operation and/or movement of the choke valve 111. While discussed further below, some embodiments of this system and ignition module 3000 may include a wireless transceiver 600 and not include any electronic auto-choke system 1000.

The ignition module 3000 may be operably coupled to a power supply 140, such as a battery, alternator or other energy storage device. The internal combustion engine 100 may include and be supplemented by many other subsystems and elements/components.

As noted, the controller 10, and/or the ignition module 3000, may include a processor 11 and a memory device 12. While the processor 11 and memory device 12 are exemplified as separate components, the memory device 12 may be integrated with the processor 11 in some embodiments. Moreover, while only one processor 11 and one memory device 12 are exemplified, the controller 10 may comprise multiple processors 11 and/or multiplier memory devices 12. Any suitable memory devices may be used including non-volatile memory and volatile memory.

The processor 11 may be any computer central processing unit (CPU), microprocessor, micro-controller, computational device, or circuit configured for executing some or all of the processes described herein, including without limitation: (1) the retrieval and execution of the choke valve relational data tables: (2) the receipt, interpretation and usage of the temperature signals generated by the first and second temperature sensors 30, 40 as determining variables for the relational data tables; (3) the receipt, interpretation and usage of the engine speed signals generated by the engine speed sensor 60 in determining whether an engine cranking speed and/or engine starting speed has been reached, along with determining whether a low speed or high speed protocol should be used; (4) the generation and communication of the control signals that operate the actuator 20 to move the choke valve 111 to the desired position and at the desired rate; (5) the generation and communication of data via the wireless transceiver 600 to a remote electronic device 601; and/or (6) the receipt, interpretation, and usage or control based on data or control signals received from the remote electronic device 601 via the wireless transceiver 600. Many other functions and processes may be performed by the processor 11. The processor 11 may further obtain sensor data, process it, and send to the wireless transceiver 600. In addition, the processor 11 may be configured to receive a request from wireless transceiver module for ignition timing change, engine/application ID, security shutdown and performance change, and modify the choke and ignition timing characteristics based on those requests. In some implementations, based on the circuit layout, the processor 11 can also be the power source to the wireless module. The processor may further control the timing of the data transmission/reception, and control what data to send and receive.

The memory device 12 may include, without limitation, any suitable volatile or non-volatile memory including random access memory (RAM) and various types thereof, read-only memory (ROM) and various types thereof, USB flash memory, and magnetic or optical data storage devices (e.g. internal/external hard disks, floppy discs, magnetic tape CD-ROM, DVD-ROM, optical disk, ZIP™ drive, Blu-ray disk, and others), which may be written to and/or read by the processor 11 which is operably connected thereto. The memory device 12 may store the relational data tables (described in greater detail below) or other algorithms and/or calculations that can be used (by the processor 11) to transmit or receive data, determine the desired position of the choke valve 111 and/or the rate at which the choke valve 111 is moved, as well as control various other functions of the engine 100 or the engine's subsystems. The temperatures measured by each of the first and second temperature sensors 30, 40, along with the engine speed measured by the engine speed sensor 60, may be used as input variables for data collected by the processor 11, and/or to establish optimal positions of the choke valve 111 during a choke opening event and/or the rate at which the choke valve 111 moves between said optimal positions. The processor 11 of ignition module controller 10 may in turn send control signals to actuator 20 associated with the choke valve 111 to control the position of the valve of flow of ambient combustion air to the combustion chamber 121. However, it will be appreciated that this enabled ignition module 3000 and the associated software could also control many other actuators, to control other aspects of engine operation.

While the determination of the optimal positions of the choke valve 111 and the optimal rates at which the choke valve 111 moves between said optimal positions will be described herein in terms of using a relational data table, the invention is not so limited in all aspects. For example, choke valve positioning and rate of movement calculations may take many forms, including without limitation, one or more algorithms, one or more relational data tables, or combinations thereof.

The controller 10 may be operably coupled to the actuator 20. The actuator 20, in turn, may be operably coupled to the choke valve 111. The controller 10 may operate the actuator 20 in a desired manner by generating and transmitting control signals. For example, the controller 10 may generate control signals based on the determinations made during carrying out of the method discussed herein (such as for example the four pulse sets). In response to the control signals resulting from execution of the methods described herein, the actuator 20 may be appropriately activated, thereby adjusting/moving the choke valve 111 to a desired position that corresponds to that which has been determined by the controller 10. In response to these control signals, the actuator 20 may be appropriately activated, thereby adjusting position of the choke valve 111 and the rate at which the choke valve 111 moves.

The choke valve 111 may be adjusted between a fully-closed position, a fully-open position, and any incremental and/or continuous positional setting between the fully-closed and fully-open position. One such position is a starting position that may be determined to be an optimal position for achieving start-up of the engine from an engine off state. The actuator 20 may be operably coupled to the choke valve 111 via a mechanical linkage 65. Mechanical linkages can take the form of any mechanical connection between the choke valve 111 and the actuator 20 such that when the actuator 20 operates/moves, there is a related and determined movement of the choke valve 111, which may be a choke plate of the carburetor 110. Mechanical linkages can comprise rods with ball and socket joints, linkage bars connected between the choke plate, and coupling of the end of the actuator shaft through a clevis. However, non-mechanical linkages are envisioned, such as electromagnetic and/or thermal couplings. When a mechanical linkage 65 is utilized, it is to be understood that the mechanical linkage 65 can take on a wide variety of linkage elements and arrangements thereof, none of which should be considered limiting of the present invention.

The choke valve 111, in certain structural arrangements, may be a butterfly valve as is common in the art of carburetors. In such an arrangement, the position of a choke plate may be controlled by rotating or pivoting the choke plate via actuator 20 about a choke axis (which may be generally perpendicular to the direction of air flow) so that the choke plate assumes different angular positions within an air passageway of the carburetor 110. At each different angular position, the choke plate may obstruct a different percentage of the transverse area of the air passageway of the carburetor 110. As a result, the flow characteristics of the ambient air flow 112 therethrough is altered. Because fuel is introduced into this ambient air flow stream 112 via the fuel supply line 131, the fuel-to-air ratio of the fuel mixture that is created within the carburetor 110 (and ultimately supplied to the combustion chamber 121 via the fuel mixture line 115) is varied by the choke plate position.

While the choke valve 111 may be a butterfly valve comprising a pivotably adjustable choke plate, the choke valve 111 is not limited to a choke plate structure. The choke valve 111 can be any type of device that can be manipulated to various positions (i.e., settings) that ultimately varies the fuel-to-air ratio of the fuel mixture that is provided to the combustion chamber 121. For example, and without limitation, the choke valve 111 can take the form of a gate valve, a globe valve, a pinch valve, a diaphragm valve, a needle valve, a plug valve, a ball valve, a control valve, or combinations thereof.

In one aspect, the actuator 20 may comprise a stepper motor. The stepper motor may divide the rotation required to adjust the choke valve 111 from the fully-closed position to the fully-open position into a number of increments such that fine adjustment of the setting of the choke valve 111 may be achieved. The stepper motor's position can be commanded by the controller 10 to move and hold at any one of these increments. In certain arrangements, a relay control device or circuit 160 mounted directly inside ignition module housing 3000 on circuit board 4055 (see, e.g. FIG. 5) may be in the form of a motor driver circuit 160 (see, e.g. FIGS. 3 and 5) included as part of the electronic auto-choke system 1000. Motor driver circuit 160 may be operably coupled between the controller 10 and the actuator 20. In instances where the actuator 20 is a bipolar stepper motor, the motor driver circuit 160 may be used to control and drive the current in one winding of the bipolar stepper motor and comprise a compatible logic input, a current sensor, a monostable and an output stage with built-in protection diodes. In certain other arrangements, the motor driver circuit may be omitted or built into the stepper motor itself. The motor driver circuit 160 may also comprise a separate internal timer that determines the driver rate. Additional controls for micro-stepping or half-stepping the actuator 20 may also be included if the design requires such a specialized control.

In some embodiments, the actuator 20 may be a stepper motor wherein motor movement is divided into equal increments of four motor steps. Four full steps of the unipolar stepper motor can also be seen as one full revolution of the motor. Motor movement in both directions may be referred to as revolutions. In one such example, a stepper motor is utilized in which 55 revolutions may be carried out to move the choke valve 111 from the fully-closed position to the fully-open position.

The actuator 20 may be any device or assembly that can convert the control signal that is generated by the controller 10 into physical manipulation of the choke valve 111 to adjust the setting thereof. For example, in some arrangements, the actuator 20 may take the form of electric actuators, electromagnetic actuators, piezoelectric actuators, pneumatic actuators, hydraulic pistons, relays, comb drives, thermal bimorphs, digital micro-mirror devices and electroactive polymers. Such electric actuators may include a solenoid.

It will be appreciated that although actuator 20 (controlled by a relay control circuit such as motor drive circuit 160 mounted inside ignition module housing 3010) is described as controlling choke valve 111 which represents a pivotable type of engine control mechanism in the form a butterfly valve, the invention is not limited to such engine control mechanisms of an auto choke system 1000. In other embodiments for example, the relay control circuit may be configured to control other types of engine control mechanisms such as without limitation a sliding type control mechanism, a crank or gear mechanism, or other. Accordingly, the relay control circuit and actuator 20 are not limited to any particular type of engine control mechanism which can be controlled via controller 10 mounted in the ignition module 3000. In addition, the relay control circuit and actuator 60 may be used to control an electronic or pneumatically actuated engine control mechanism.

It will be appreciated that the ignition module controller 10 may be used to control other devices and systems associated with the engine beyond that associated with an auto choke system. Accordingly, additional relay control circuits or drives mounted on circuit board 4055 and actuators may be provided which are controlled by controller 10 (see, e.g. FIG. 3).

The first temperature sensor 30 may be positioned to measure a first temperature that is indicative of the temperature of the internal combustion engine 100. As exemplified, the first temperature sensor 30 may be mounted to the engine block 120 to measure the temperature of the engine block 120 itself as the first temperature. As used herein, the term engine block may include the engine crankcase 123, the cylinder blocks 124, and the cylinder heads 125 (see FIG. 21). Alternatively, the first temperature sensor 30 may be mounted to another structure sufficiently adjacent to (or in thermal cooperation with) the engine block 120 such that a reliable temperature measurement thereof can be obtained. In still other systems, the first temperature sensor 30 may be mounted to or adjacent another component of the engine 100, and may measure the temperature at or adjacent that component.

In some embodiments, the first temperature sensor 30 may be mounted to the engine crankcase 123 itself at a position adjacent a flywheel 126 of the internal combustion engine 100 (see FIG. 21). In other arrangements, the first temperature sensor 30 may be mounted at alternate locations on the engine block 120 or may be mounted adjacent the engine block 120 and in contact therewith. In other arrangements, the first temperature sensor 30 may be in contact with a component in thermal cooperation with the engine block 120 that can provide a thermal reading that corresponds to the temperature of the engine block 120 in a determinable manner. In some embodiments, the first temperature sensor 30 may be mounted to the lamination stack 4070 of an ignition module 3000, which in turn is mounted to the engine crankcase 123 and, thus, is in thermal cooperation therewith.

As mentioned above, the first temperature sensor 30 may measure the engine temperature and output a first temperature signal that is indicative of the engine temperature. This first temperature signal may be transmitted to the controller 10 via the electrical connection/communication pathway 51 where it is utilized by the controller to determine starting position of the choke valve 111 and/or a rate at which the choke valve 111 is to be opened, as discussed in greater detail below). The first temperature sensor 30 can repetitively or continuously measure the first temperature so that the controller 10 is automatically provided with first temperature signals that are indicative of the engine temperature. Alternatively, the first temperature sensor 30 may periodically measure the engine temperature at predetermined temporal periods, predetermined engine events, and/or predetermined engine conditions so that the controller 10 is provided with first temperature signals that are indicative of the engine temperature only at certain desired times, engine events, engine conditions, or upon prompting.

The first temperature sensor 30 may be an electrical temperature sensor. For example, the first temperature sensor 30 may comprise one or more thermistors. In other arrangements, the first temperature sensor 30 may comprise one or more thermocouples, resistance thermometers, silicon bandgap temperature sensors, thermostats, RTD's and/or state change temperature sensors.

A second temperature sensor 40 may be positioned to measure a second temperature that may be indicative of the temperature of the ambient air 150. As exemplified, the ambient air 150 in which the second temperature sensor 40 may be positioned to measure the temperature of is eventually drawn into the carburetor 110 where it is used to create the fuel mixture that is delivered to the combustion chamber 121 via fuel mixture line 115. The second temperature sensor 40 may, however, be positioned at other locations that are exposed to the ambient air 150 that is not drawn into the carburetor. For example, the second temperature sensor 40 may be positioned near a blower intake in an air-cooled engine arrangement (see FIG. 6) or at any position that is subjected to the ambient air 150. In still other systems, the second temperature sensor 40 may be positioned to measure other temperatures, such as a separate engine component temperature or air (such as intake, exhaust, or cooling air) temperature.

The second temperature sensor 40 may measure the ambient air temperature and output a second temperature signal that may be indicative of the ambient air temperature. This second temperature signal may be transmitted to the controller 10 via the electrical connection/communication pathway 52 where it may be utilized by the controller 10 to determine a rate at which the choke valve 111 is to be opened. In other arrangements, the second temperature signal may also be utilized by the controller 10 to determine the starting position of the choke valve 111 (in combination with the first temperature signal).

The second temperature sensor 40 can repetitively or continuously measure the second temperature so that the controller 10 is automatically provided with second temperature signals that are indicative of the ambient air temperature. Alternatively, the second temperature sensor 40 may periodically measure the second temperature at predetermined temporal periods, predetermined engine events, and/or predetermined engine conditions so that the controller 10 may be provided with second temperature signals that are indicative of the ambient air temperature only at certain desired times, engine events, engine conditions, or upon prompting.

The second temperature sensor 40 may be an electrical temperature sensor. For example, the second temperature sensor 40 may comprise one or more thermistors. In other arrangements, the second temperature sensor 40 may comprise one or more thermocouples, resistance thermometers, and/or silicon bandgap temperature sensors. In certain arrangements of the invention, the second temperature sensor 40 may be omitted if ambient air temperature does not play a role in the determination of the optimization of choke valve positioning and/or rate of movement of the choke valve.

The engine 100, ignition module 3000, and/or the electronic auto choke system 1000, may additionally comprise an engine speed sensor 60. The engine speed sensor 60 may be configured to measure the rotational speed of the internal combustion engine. The engine speed sensor 60 may be operably coupled to the controller 10 via the electrical pathway 55, as described above. The engine speed sensor 60 may measure the engine speed of the internal combustion engine and relays this information to the controller 10 so that the controller can utilize the measured engine speed in determining optimal positioning of the choke valve 111 and/or rate(s) at which the choke valve 111 is opened, as discussed in greater detail below. In one arrangement (see FIG. 21), the engine speed sensor 60 may comprise a charging coil that may be considered a rotation sensor that, in response to a magnet on the flywheel, generates an electric charge due to a magnetic path being formed in a lamination stack. In other arrangements, such as when a magneto ignition system is not used, a rotation sensor may be provided that is a component other than and/or in addition to the charging coil that can detect rotation of the engine through mechanical, electrical or magnetic detection, potentially through proper coupling to a crankshaft or a camshaft.

The engine speed sensor 60 can repetitively or continuously measure the engine speed so that the controller 10 may be automatically provided with engine speed measurements. Alternatively, the engine speed sensor 60 can periodically measure the engine speed at predetermined temporal periods, predetermined engine events, and/or predetermined engine conditions so that the controller 10 is provided with engine speed measurements only at certain desired times, engine events, engine conditions, or upon prompting.

The engine 100, ignition module 3000, and/or auto-choke system 1000 may, in some embodiment, also include additional sensors so that other variables and/or data can be collected, sent to the electronic device 601, used for controlling the engine 100 or various subsystems of the engine 100, and/or taken into consideration in determining the optimal positioning of the choke valve 111 and/or the optimal rate at which the choke valve 111 is opened. For example, sensors may be configured to measure air-to-fuel ratios (or oxygen levels) in the carburetor, engine load, and/or exhaust gas characteristic and take it into consideration in determining the optimal scheme for controlling the choke valve 111 opening. This may be accomplished by providing sensors or other mechanisms for measuring the desired parameter and/or condition and providing the measured parameter and/or condition to the controller 10. As one example, the determination of the position and rate of opening of the choke valve 111 may be modified in an appropriate manner to include the additional parameter and/or condition as a variable in determining the control scheme of the choke valve 111.

In one such arrangement, an exhaust gas sensor 50 may be provided that measures an exhaust gas characteristic that is transmitted to the controller 10. The measurements from the sensor 50 may be used to determine combustion operation parameters for the engine 100, which may be stored and/or sent to the electronic device 601 for analysis and/or presentation to a user. The measurements from the sensor 50 may additionally or alternatively be collected for consideration in determining the optimized control scheme of the choke valve 111 during engine startup and/or shutdown. The exhaust gas sensor 50 may be operably coupled to an exhaust line 122 of the combustion chamber 121. The exhaust gas sensor 50 may measure a desired characteristic of the exhaust gas. The exhaust gas sensor 50 can, for example, be a concentration sensor that measures the concentration of a particular compound or gas in the exhaust gas stream, such as an oxygen concentration sensor.

The exhaust gas sensor 50 may generate and transmit a signal indicative of the measured exhaust gas characteristic to the controller 10 for processing via the electrical connection/communication pathway 56. To this end, a modified version of the relational data tables (or other calculations or algorithms) may be stored in the memory device 12 that include the measured exhaust gas characteristic as a variable, in addition to the measured engine temperature, ambient air temperature, and/or engine speed. The processor 11 may retrieve the modified versions of the relational data tables from the memory device 12 and determine the optimal control scheme for the choke valve 111 using the modified versions of the relational data tables. In some embodiments, the exhaust gas sensor 50 (or other sensor that is configured to measure a parameter indicative of the air-to-fuel ratio to be or being combusted in the combustion chamber) can be operably coupled to the controller 10 to form a closed feedback loop in which the rate and/or position of the choke valve 111 is dynamically controlled during the second choke opening stages COS2 in response to measurements taken by such a feedback sensor, which may be in substantially real-time.

With continuing reference to FIGS. 1-5, the ignition module 3000 may include the actuator 20, the controller 10 (which comprises the processor 11 and memory device 12), the first temperature sensor 30, the second temperature sensor 40, the motor driver circuit 160, and the electrical connection/communication pathways 51-54.

The ignition module 3000 may further comprise an ignition circuit 4000 (regardless of whether the ignition module 3000 includes an auto-choke system 1000). The ignition circuit 4000 may comprise one or more of a charging coil 4010, a conditioning circuit 4020, an energy storage device 4030, a switch 4040, an ignition coil 4050, and a steel lamination stack 4070. The charging coil 4010, the conditioning circuit 4020, the energy storage device 4030, the switch 4040, and the ignition coil 4050 may be in operable cooperation with one another, and with the controller 10, via the electrical connection/communication pathways 56-60. The steel lamination stack 4070 may be operably positioned relative to the charging coil 4010.

In some embodiments, the charging coil 4010 can be conceptually considered an engine speed sensor that, in response to the magnet 127 of the flywheel 126, may generate an electric charge due to a magnetic path being formed in the steel lamination stack 4070. Specifically, the charging coil 4010 may surround a central leg (not visible) of the steel lamination stack 4070 and, as the magnet 127 on the flywheel 126 severs the magnetic flux in the steel lamination stack 4070 as it passes, a magnetic path is formed within this central leg that, in turn, generates the electrical charge in the charging coil 4010. This induced electric charge not only may provide a pulse charge to the energy storage device 4030 (which may be a high voltage capacitor), but also may be received/detected by the controller 10 (after conditioning by the conditioning circuit 4020). Based on the timing of the electric pulses generated by the charging coil 4010, the controller 10 may determine the rotational speed of the engine. The charging coil's electric pulses may be conditioned to provide a signal acceptable to the processor 11, as shown in the current diagram. In other arrangements, such as when the ignition module is not a magneto ignition system, a rotation sensor may be provided that is a component other than and/or in addition to the charging coil 4010 that can detect rotation of the engine through mechanical, electrical or magnetic detection, potentially through proper coupling to a crankshaft or a camshaft.

The electrical connection/communication pathways 56-60 can comprise, without limitation, electrical wires, fiber-optics, communication cables, wireless communication paths, and combinations thereof. The exact structural nature and arrangement of the electrical connection/communication pathways 56-60 may not be limiting of the present invention, so long as each of the electrical connection/communication pathways 56-60 can facilitate the desired operation, communication, powering, and/or control between the coupled elements/components, as described in greater detail below.

The ignition module 3000 may include a housing 3010 that may contain and/or encapsulate the ignition circuit 4000 and some or all of the elements/components of the electronic auto-choke control system 1000. As exemplified, the ignition module may be a magneto ignition system.

By directly positioning the wireless transceiver 6000, the ignition circuit 4000, and in some cases control portions of the electronic auto choke system 1000 such as at least motor driver 160 within the same ignition module housing 3010, a single unit is created that can be mounted to the engine block 120 (specifically to the engine crankcase 123) in a single step. In the non-limiting exemplified arrangement, the ignition module 3000 can be mounted to the engine block 120 by coupling the steel lamination stack 4070 thereto via threaded bolts or other type fasteners. The steel lamination stack 4070 is, in turn, directly coupled to the housing 3010, thereby facilitating mounting of the entire integrated ignition module 3000 with stack 4070 to the engine block 210. As shown in FIG. 4, the steel lamination stack 4070 may include mounting holes 4071 which receive fasteners to help provide secure mounting of the stack and ignition module 3000 to the engine block 210. It bears noting that the steel lamination stack 4070 may be incorporated and mounted directly to the ignition module housing 3010, and either completely exposed or partially encapsulated within the potting compound 4080 of the housing 3010. If partially encapsulated, at least portions of the steel lamination stack 4070 with mounting holes 4071 may remain exposed for mounting to the engine block. The steel lamination stack 4070 may physically adjoin the charging coil 4010 which is encapsulated within the potting compound 4080 of the ignition module housing 3010.

In addition to controlling the wireless transceiver 600 and/or the auto-choke control system 1000, the controller 10 can be configured to control the ignition circuit 4000, such as by controlling the timing for firing the spark plugs 4060. For example, the controller 10 may adjust the firing angle (retard firing) and optimize ignition timing when choking the engine. The housing 3010 can define a single internal cavity or can include internal walls that divide the internal cavity into multiple chambers. Additionally, the housing 3010 may be a fully enclosed housing or a partially enclosed housing having at least one open side. In the exemplified arrangement, the housing 3010 includes a potting compound 4080 that seals the interior thereof, along with the components enclosed therein for protecting against the engine operating environment.

As exemplified, the controller 10 and the motor driver circuit 160 may be fully disposed within an interior cavity of the housing 3010. The first temperature sensor 30, if included, may partially protrude outwards from inside the housing 3010. More specifically, the first temperature sensor 30 may protrude from the housing 3010 and may be coupled to the steel lamination stack 4070 so as to be in thermal coupling therewith. In some embodiments, the first temperature sensor 30 may be embedded in the steel lamination stack 4070. As a result of being coupled to (which includes embedding) the steel lamination stack 4070, the first temperature 30 measures the temperature of the steel lamination stack 4070, which in turn becomes heated (and cooled) in a manner corresponding to the engine block 120 due its thermal cooperation therewith. Thus, the first temperature sensor 30 measures the engine block temperature.

The second temperature sensor 40, if included, may also partially protrude outwards from inside the housing 3010 so that at least a portion of the second temperature sensor 40 remains exposed to the surrounding environment. This may allow the ambient air 150 that enters the blower housing 500 to come into contact with the second temperature sensor 40. As a result, despite being part of the ignition module 3000, the second temperature sensor 40 may still measure the temperature of the ambient air flow 150. In certain arrangements of the ignition module 3000, the second temperature sensor 40 may be located entirely outside of the housing 3010 and may even be omitted.

FIG. 3 shows the arrangement of components with respect to which components may be physically mounted to and/or inside the ignition module housing 3010, and those components which may be located externally to the housing either proximately or more remotely. The ignition module housing 3010 is represented by a solid line as shown. The components located inside the solid line are directly mounted to and inside the housing 3010 being fully encapsulated by the potting compound 4080 for protection from the engine operating environment (e.g. transceiver 600, ignition coil 4050, charging coil 4010, controller 10, motor driver 160, etc.). Components such as temperature sensors 30 and 40 are partially encapsulated within the potting compound 4080 and housing 3010 such that a portion of the sensors remains exposed to measure temperatures external to the ignition module housing. Components such as the steel lamination stack 4070 are shown mounted directly to the exterior of the housing 3010, or in some embodiments may be partially encapsulated by the potting compound 4080 similarly to the temperature sensors 30, 40. Other components such as the carburetor 110 with choke valve 111, actuator 20, and spark plugs 4060 are completely external to and not attached directly to the ignition module housing 3010. These components nonetheless may be operably and communicably coupled to the ignition module controller 10 or other components encapsulated within the ignition module housing 3010. FIG. 4 shows one embodiment of an ignition module housing 3010 of the ignition module 3000.

The ignition module 3000 may be mounted to the engine block 120 adjacent the flywheel 126. For example, the ignition module 3000 may be mounted to the engine crankcase 123 adjacent the flywheel 126, for example, by the steel lamination stack 4070 as described above. A magnet 127 may be provided on the flywheel 126. During rotation of the flywheel 126 about the crankshaft 128, the magnet 127 may pass the ignition module steel lamination 4070 cutting the magnetic flux lines and creating a magnetic field in the central leg that causes charging coil 4010 to generate a high voltage supply that charges the energy storage device 4030, which may be a high voltage capacitor. The switch 4040, which is in the form of a semiconductor-controlled rectifier, may transfer the energy stored in the energy storage device 4030 to the primary 4051 of the ignition coil 4050, thereby creating a magnetic field that charges the secondary 4052 of the ignition coil 4050. As a result of the secondary 4052 being charged, the spark plug 4060 may be fired/sparked.

The controller 10, through its monitoring of the rotational speed and rotation positioning of the engine (via for example the position of the engine crankshaft and/or camshaft), may synchronize the spark of the spark plug 4060 with the engine rotation. The conditioning circuit 4020 may perform one or more of the following functions: (1) optimization of the gate current of the switch 4040 for all the RPM range; (2) filters parasitic strikes occurring on the sensor signal; and/or (3) ensures the correct lead angle. While the ignition circuit 4000 may be exemplified as a capacitive discharge ignition, it is to be understood that various types of ignition circuits can be incorporated into the ignition module 3000 in accordance with the present invention, such as an inductive discharge ignition. Additionally, while a magneto ignition system is exemplified, the ignition module 3000 may comprise other types of ignition systems, such as a battery and coil-operated ignition, a mechanically timed ignition, and an electronic ignition.

As exemplified in FIGS. 4-5, the ignition module controller 10 may comprise two processors 11, which are mounted to a circuit board 4055, along with the motor driver 160, the switch 4040, the energy storage device 4030 and a shut-off terminal 4096. Additionally, a ground tab 4090 is also provided. The ground tab 4090 is coupled to the steel lamination stack 4070, which acts as the ground through its coupling to the engine block 120. A power in line 4098 is also provided for receiving 12V power. Leads 4097 protrude from the potting compound 4080 of the housing 3010 for connection to the motor/DLA. Similarly, a high voltage secondary lead 4095 also protrudes from the housing 3010 for electrically coupling to the spark plug boot and terminal.

As mentioned above, the internal combustion engine 100 may be an air-cooled engine and thus comprises a plurality of heat conducting fins 129 extending from the cylinder banks 124. Moreover, the internal combustion engine 100 is positioned within a blower housing 500 that comprises a blower 501 that draws in and forces an ambient air flow 150 over the internal combustion engine 100, including over the second temperature sensor 40 and into the carburetor 110.

The ignition module 3000 may gather data from any of the above-referenced sensors, may analyze any of said collected data, and/or may send such data to the remote electronic device 601, which may itself analyze said data. The ignition module 3000, or the electronic device 601, may use collected and/or analyzed data to identify preventative maintenance or failures associated with the engine 100. For example, data related to the run time of the engine 100 may be collected and analyzed to determine when the engine oil should be replaced. The data, or an engine oil change signal, may be transmitted by the ignition module 3000 to the electronic device 601, and displayed to the end user. May other examples are possible.

While the foregoing description and drawings represent some example systems, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention.

What is claimed is:

1. An integrated ignition module for an internal combustion engine, the module comprising:
   a housing configured for attachment to a chassis;
   an ignition circuit disposed in the housing;
   a programmable controller disposed in the housing; and
   a wireless transceiver disposed in the housing, the transceiver operably and communicably coupled to the controller to wirelessly exchange data between the controller and an external electronic device;
   wherein the ignition circuit is controlled by the controller and includes an ignition coil disposed in the housing; and
   wherein the ignition circuit further includes a charging coil and an energy storage device.

2. The module according to claim 1, wherein the transceiver is oriented out of phase with electromagnetic radiation generated by the ignition coil.

3. The module according to claim 1, further comprising at least one air temperature sensor operable to sense and transmit a temperature of ambient combustion air and at least one engine temperature sensor operable to sense and transmit an operating temperature of the engine, the controller configured to detect the transmitted temperatures.

4. The module according to claim 3, further comprising an engine speed sensor operable to sense and transmit a measured speed of the engine to the controller.

5. The module according to claim 4, wherein the controller is operably coupled to an actuator associated with a choke valve that controls a flow of ambient combustion air to the engine, the controller configured to adjust a position of the choke valve based on the transmitted temperatures and speed of the engine.

6. The module according to claim 5, wherein the actuator is a stepper motor.

7. The module according to claim 1, wherein the controller is configured via program instructions to collect and analyze engine operational data obtained via a plurality of sensors and perform basic analytics to generate derived engine data.

8. The module according to claim 7, wherein the external electronic device is configured via program instructions to perform more in-depth analytics on the derived engine data received from the controller via the transceiver.

9. The module according to claim 8, wherein the external electronic device sends control instructions to controller via the transceiver based on the more in-depth analytics to alter operation of the engine.

10. The module according to claim 1, further comprising an auto-choke system disposed in the housing.

11. The module according to claim 1, wherein the controller is configured to control operation of the transceiver including transmission and reception of data to and from the external electronics device.

12. An integrated ignition module for an internal combustion engine, the module comprising:
   a housing configured for attachment to a chassis;
   an ignition circuit disposed in the housing;
   a programmable controller disposed in the housing; and
   a wireless transceiver disposed in the housing, the transceiver operably and communicably coupled to the controller to wirelessly exchange data between the controller and an external electronic device;

wherein the ignition circuit is controlled by the controller and includes an ignition coil disposed in the housing; and wherein the transceiver is oriented out of phase with electromagnetic radiation generated by the ignition coil.

\* \* \* \* \*